(12) United States Patent
Kaal

(10) Patent No.: US 8,457,144 B2
(45) Date of Patent: Jun. 4, 2013

(54) COMMUNICATION SYSTEM

(75) Inventor: Madis Kaal, Dublin (IE)

(73) Assignee: Skype, Dublin (IE)

( * ) Notice: Subject to any disclaimer, the term of this patent is extended or adjusted under 35 U.S.C. 154(b) by 653 days.

(21) Appl. No.: 11/986,973

(22) Filed: Nov. 27, 2007

(65) Prior Publication Data

US 2008/0144578 A1 Jun. 19, 2008

(30) Foreign Application Priority Data

Nov. 27, 2006 (GB) .................................. 0623621.0
Nov. 23, 2007 (GB) .................................. 0723121.0

(51) Int. Cl.
*H04L 12/28* (2006.01)

(52) U.S. Cl.
USPC ........... 370/410; 370/467; 370/401; 370/392; 370/389; 379/207.13; 379/142.01; 379/142.04

(58) Field of Classification Search
USPC ................. 370/352, 353, 354, 355, 312, 356, 370/420, 401, 466, 467, 410, 389, 392; 379/207.13, 142.01, 142.04
See application file for complete search history.

(56) References Cited

U.S. PATENT DOCUMENTS

| | | | |
|---|---|---|---|
| 6,061,363 A * | 5/2000 | Evans et al. .................... | 370/467 |
| 6,718,028 B2 | 4/2004 | Culli et al. | |
| 6,765,921 B1 | 7/2004 | Stacey et al. | |
| 7,177,837 B2 | 2/2007 | Pegaz-Paquet et al. | |
| 7,298,714 B2 | 11/2007 | Foster | |
| 7,403,517 B2 | 7/2008 | Westman | |
| 7,454,201 B2 | 11/2008 | Brooking et al. | |
| 7,565,436 B2 | 7/2009 | Rabie et al. | |
| 7,675,881 B2 | 3/2010 | Verma et al. | |
| 7,735,126 B2 | 6/2010 | Zhang et al. | |
| 7,756,548 B2 | 7/2010 | Laroia et al. | |

(Continued)

FOREIGN PATENT DOCUMENTS

CN 1839594 9/2006
EP 0 695 059 A1 1/1996

(Continued)

OTHER PUBLICATIONS

Notification Concerning Transmittal of International Preliminary Report on Patentability (Chapter I of the Patent Cooperation Treaty), from International Appiication No. PCT/IB2007/004279, dated Jun. 3, 2009.

(Continued)

*Primary Examiner* — Dady Chery
(74) *Attorney, Agent, or Firm* — Wolfe-SBMC

(57) ABSTRACT

A communication session between a user of a communication network and a communication system is controlled. The communication network comprises a first network and a second network. The communication system operates on the first network. A session request packet is transmitted from a device of the user to a first node in the first network. The session is initiated with the communication system at the first node responsive to receiving the session request. During the session, a calling identity is provided from the first node to the device and used by the device during a communication event between the user and an entity. The calling identity is used to establish a connection between the device and a second node in the second network. The calling identity is associated with an address of the entity. Upon termination of the session, the calling identity is disassociated from the address of the entity.

20 Claims, 7 Drawing Sheets

U.S. PATENT DOCUMENTS

| | | | |
|---|---|---|---|
| 7,839,992 B2 | 11/2010 | Croak et al. | |
| 7,929,955 B1 | 4/2011 | Bonner | |
| 8,014,511 B2 | 9/2011 | Kaal et al. | |
| 8,170,563 B2 | 5/2012 | Kaal | |
| 8,175,091 B2 | 5/2012 | Kaal | |
| 8,238,539 B2 | 8/2012 | Kaal et al. | |
| 2002/0032631 A1* | 3/2002 | Rose | 705/37 |
| 2002/0071424 A1 | 6/2002 | Chiu et al. | |
| 2002/0103998 A1 | 8/2002 | DeBruine | |
| 2002/0116464 A1 | 8/2002 | Mak | |
| 2002/0137500 A1 | 9/2002 | Brooking et al. | |
| 2002/0143855 A1 | 10/2002 | Traversat et al. | |
| 2003/0002485 A1 | 1/2003 | Emerson et al. | |
| 2003/0105812 A1* | 6/2003 | Flowers et al. | 709/203 |
| 2003/0112823 A1* | 6/2003 | Collins et al. | 370/474 |
| 2003/0130008 A1 | 7/2003 | Rajaniemi et al. | |
| 2003/0224781 A1 | 12/2003 | Milford et al. | |
| 2005/0005030 A1 | 1/2005 | Asai | |
| 2005/0074102 A1 | 4/2005 | Altberg et al. | |
| 2005/0141509 A1 | 6/2005 | Rabie et al. | |
| 2005/0144327 A1 | 6/2005 | Rabie et al. | |
| 2005/0176410 A1 | 8/2005 | Brooking et al. | |
| 2005/0286519 A1 | 12/2005 | Ravikumar et al. | |
| 2006/0072547 A1 | 4/2006 | Florkey et al. | |
| 2006/0077971 A1 | 4/2006 | Flowler | |
| 2006/0227959 A1 | 10/2006 | Mitchell | |
| 2006/0229101 A1 | 10/2006 | LaBauve et al. | |
| 2006/0258289 A1 | 11/2006 | Dua | |
| 2007/0019623 A1 | 1/2007 | Alt et al. | |
| 2007/0066273 A1 | 3/2007 | Laroia et al. | |
| 2007/0117548 A1 | 5/2007 | Fernandez-Alonso et al. | |
| 2007/0238472 A1* | 10/2007 | Wanless | 455/461 |
| 2008/0045186 A1 | 2/2008 | Black et al. | |
| 2008/0137829 A1 | 6/2008 | Kaal et al. | |
| 2008/0137834 A1 | 6/2008 | Kaal et al. | |
| 2008/0139208 A1 | 6/2008 | Kaal | |
| 2008/0144578 A1 | 6/2008 | Kaal | |
| 2008/0152108 A1 | 6/2008 | Kaal et al. | |
| 2008/0165790 A1 | 7/2008 | Kaal | |
| 2008/0192734 A1 | 8/2008 | Oruaas et al. | |
| 2008/0205308 A1 | 8/2008 | Prehofer et al. | |
| 2012/0033797 A1 | 2/2012 | Kaal et al. | |
| 2012/0219009 A1 | 8/2012 | Kaal | |

FOREIGN PATENT DOCUMENTS

| | | |
|---|---|---|
| EP | 1 515 506 A1 | 3/2005 |
| EP | 1 643 740 | 4/2006 |
| EP | 1690165 | 8/2006 |
| GB | 2 398 458 A | 8/2004 |
| GB | 2 405 285 A | 2/2005 |
| WO | WO 99/67922 | 12/1999 |
| WO | WO 00/51331 A1 | 8/2000 |
| WO | WO 01/24478 A2 | 4/2001 |
| WO | WO 01/39469 | 5/2001 |
| WO | WO 01/63861 | 8/2001 |
| WO | WO 02/076049 | 9/2002 |
| WO | WO 02/078268 A1 | 10/2002 |
| WO | WO 03/003678 A1 | 1/2003 |
| WO | WO 2005/009019 A2 | 1/2005 |
| WO | WO 2005/084128 A2 | 9/2005 |
| WO | WO 2006/095787 A1 | 9/2006 |
| WO | WO 2007/044049 A2 | 4/2007 |
| WO | WO 2007/077550 A1 | 7/2007 |

OTHER PUBLICATIONS

Notification Concerning Transmittal of International Preliminary Report on Patentability (Chapter I of the Patent Cooperation Treaty), from International Application No. PCT/IB2007/004260, dated Jun. 3, 2009.
Notification Concerning Transmittal of International Preliminary Report on Patentability (Chapter for the Patent Cooperation Treaty), from International Application No. PCT/IB2007/004259, dated Jun. 11, 2009.
Search Report Under Section 17 for GB 0723123.6, Date of Search: Apr. 18, 2008.
"Final Office Action", U.S. Appl. No. 13/195,541, (Aug. 15, 2012), 6 pages.
"International Report of Patentability", U.S. Appl. No. PCT/IB2007/004279, (Jun. 11, 2009), 7 pages.
"Notice of Allowance", U.S. Appl. No. 11/986,972, (Sep. 19, 2012), 5 pages.
"Notice of Allowance", U.S. Appl. No. 13/460,249, (Aug. 3, 2012), 7 pages.
"Advisory Action", U.S. Appl. No. 11/986,835, (Sep. 15, 2011), 3 pages.
"Advisory Action", U.S. Appl. No. 11/986,972, (Jan. 4, 2012), 2 pages.
"Advisory Action", U.S. Appl. No. 11/986,974, (Jun. 2, 2011), 3 pages.
"Advisory Action", U.S. Appl. No. 11/986,985, (Jul. 19, 2012),3 pages.
"Examination Report under Section 18(3)", Application No. GB0723119.4, (Apr. 27, 2011), 1 page.
"Final Office Action", U.S. Appl. No. 11/986,835, (Jun. 23, 2010), 20 pages.
"Final Office Action", U.S. Appl. No. 11/986,835, (Jul. 8, 2011), 29 pages.
"Final Office Action", U.S. Appl. No. 11/986,972, (Oct. 19, 2011), 11 pages.
"Final Office Action", U.S. Appl. No. 11/986,974, (Mar. 17, 2011), 8 pages.
"Final Office Action", U.S. Appl. No. 11/986,985, (Jun. 7, 2012), 14 pages.
"Non Final Office Action", U.S. Appl. No. 11/986,972, (Mar. 30, 2011), 10 pages.
"Non Final Office Action", U.S. Appl. No. 11/986,976, (Oct. 27, 2011), 8 pages.
"Non-Final Office Action", U.S. Appl. No. 11/986,835, (Nov. 24, 2010), 25 pages.
"Non-Final Office Action", U.S. Appl. No. 11/986,835, (Dec. 21, 2009), 10 pages.
"Non-Final Office Action", U.S. Appl. No. 11/986,974, (Jul. 18, 2011), 11 pages.
"Non-Final Office Action", U.S. Appl. No. 11/986,974, (Sep. 29, 2010), 11 pages.
"Non-Final Office Action", U.S. Appl. No. 11/986,985, (Oct. 25, 2011), 12 pages.
"Non-Final Office Action", U.S. Appl. No. 13/195,541, (May 25, 2012), 4 pages.
"Non-Final Office Action", U.S. Appl. No. 13/460,249, (Jun. 1, 2012), 9 pages.
"Notice of Allowance", U.S. Appl. No. 11/986,835, (Mar. 15, 2012), 13 pages.
"Notice of Allowance", U.S. Appl. No. 11/986,835, (Dec. 6, 2011), 13 pages.
"Notice of Allowance", U.S. Appl. No. 11/986,974, (Mar. 15, 2012), 12 pages.
"Notice of Allowance", U.S. Appl. No. 11/986,976, (Apr. 5, 2012), 4 pages.
"Notice of Allowance", U.S. Appl. No. 11/986,977, (May 3, 2011), 10 pages.
"Preliminary Report on Patentability and Written Opinion", International Application No. PCT/IB2007/004260, (Jun. 3, 2009), 8 pages.
"Preliminary Report on Patentability and Written Opinion", International Application No. PCT/IB2007/004279, (Jun. 3, 2009), 8 pages.
"Supplemental Notice of Allowance", U.S. Appl. No. 11/986,977, (Aug. 17, 2011), 2 pages.
"Supplemental Notice of Allowance", U.S. Appl. No. 11/986,977, (Jun. 21, 2011), 2 pages.

* cited by examiner

COMMUNICATION SYSTEM

RELATED APPLICATIONS

This application claims priority under 35 U.S.C. §119 or 365 to Great Britain Application No. 0623621.0, filed Nov. 27, 2006 and Great Britain Application 0723121.0, filed Nov. 23, 2007. The entire teachings of the above applications are incorporated herein by reference.

TECHNICAL FIELD

The present invention relates to a method for handling communication in a communication system.

BACKGROUND

Communication systems link together communication devices so that the devices can send information to each other in a call or other communication event. Information may include voice, text, images or video.

One such communication system is a peer to peer communication system, in which a plurality of end users can be connected for communication purposes via a communications structure such as the internet using peer to peer client software. The communications structure is substantially decentralised with regard to communication route switching therein for connecting the end users. That is, the end users can establish their own communication routes through the structure based on exchange of one or more authorisation certificates (user identity certificates—UIC) to acquire access to the structure. The structure includes an administration arrangement issuing the certificates to the end users. Such a communication system is described in WO 2005/009019.

Peer-to-peer systems and other communication systems that use the internet or any other packet switched network employ voice over IP (internet protocol) protocols (VoIP) to transmit data. These systems are commonly referred to as VoIP systems. VoIP systems are beneficial to the user as they are often of significantly lower cost than communication networks, such as fixed line or mobile networks, otherwise referred to as public switched telephone networks (PSTN). This may particularly be the case for long distance calls.

In a communication system, such as a peer to peer system, client software is installed on end user devices such as personal computers (PCs) to allow the end users to communicate via the internet. The user interface of the device can be controlled by the client software to display user facilities and to indicate events occurring, such as an incoming call.

Users may be accustomed to mobility whilst using conventional telephony services, due to the prevalence of cordless phones and mobile cellular networks. It is therefore desirable to run the client software on mobile devices such as a mobile phone or other battery operated cordless device. However, running the client software on a mobile end user device presents a number of problems. Hand held mobile devices are typically battery operated and have less CPU resource than a PC. The power requirement used to run the client software to handle the communications can reduce the battery life considerably for battery operated devices. Furthermore, running the client software on the user device may use valuable CPU resources that are required to run other applications on the device.

One further problem caused by using a mobile device in an VoIP communication system is that in a VoIP system such as a peer to peer system, it is necessary to be constantly connected to the internet in order to be notified of communication events, such as receiving a call. Maintaining a constant connection between the communication network and the internet is not only an inefficient use of battery life and CPU resources of the device, but also an inefficient use of network connection resources.

SUMMARY

It is therefore an aim of embodiments of the invention to address at least one of the above identified problems.

According to a first aspect of the invention there is provided a method of controlling a communication session between a user of a communication network and a communication system wherein the communication network comprises a first network and a second network, and wherein the communication system operates on the first network said method comprising: transmitting a session request packet from a device associated with the user to a first node located in the first network; initiating the session for the user with the communication system at the first node in response to receiving the session request, wherein during the session the method comprises the steps of providing from the first node to the device a calling identity for use by the device during a communication event between the user and an entity via the communication system, wherein the calling identity may be used to establish a connection between the device and a second node located in the second network; determining an address of the entity; and associating the calling identity with the address of the entity; wherein upon termination of the session the calling identity is disassociated from the address of the entity.

According to a second aspect of the present invention there is provided a call set up data packet comprising at least part of a calling identity for calling an entity via a packet switched network, wherein the calling identity may be used to establish a connection between a calling device and a node located in a circuit switched network.

According to a third aspect of the present invention there is provided a user device comprising: means for providing a user interface to a user of the device; and means for generating packets for transmission to a node to implement calls over a network, said packets including any one of the packets described herein.

According to a fourth aspect of the present invention there is provided a communication network arranged to control a communication session between a user of the communication network and a communication system wherein the communication network comprises a first network and a second network and wherein the communication system operates on the first network said communication network further comprising: a user device associated with the user, arranged to transmit a session request to a first node located in the first network; the first node arranged to initiate the session for the user with the communication system in response to receiving the session request; to a calling identity for use by the device during a communication event between the user and an entity via the communication system, wherein the calling identity may be used to establish a connection between the device and a second node located in the second network; and a third node located in the first network arranged to associate the calling identity with the address of the entity, wherein upon termination of the session the third node is further arranged to disassociate the calling identity from the address of the entity.

BRIEF DESCRIPTION OF THE DRAWINGS

For a better understanding of the present invention and as to how the same may be carried into effect, embodiments of the present invention will now be described by way of example only with reference to the following drawings.

DETAILED DESCRIPTION

Figure 1:
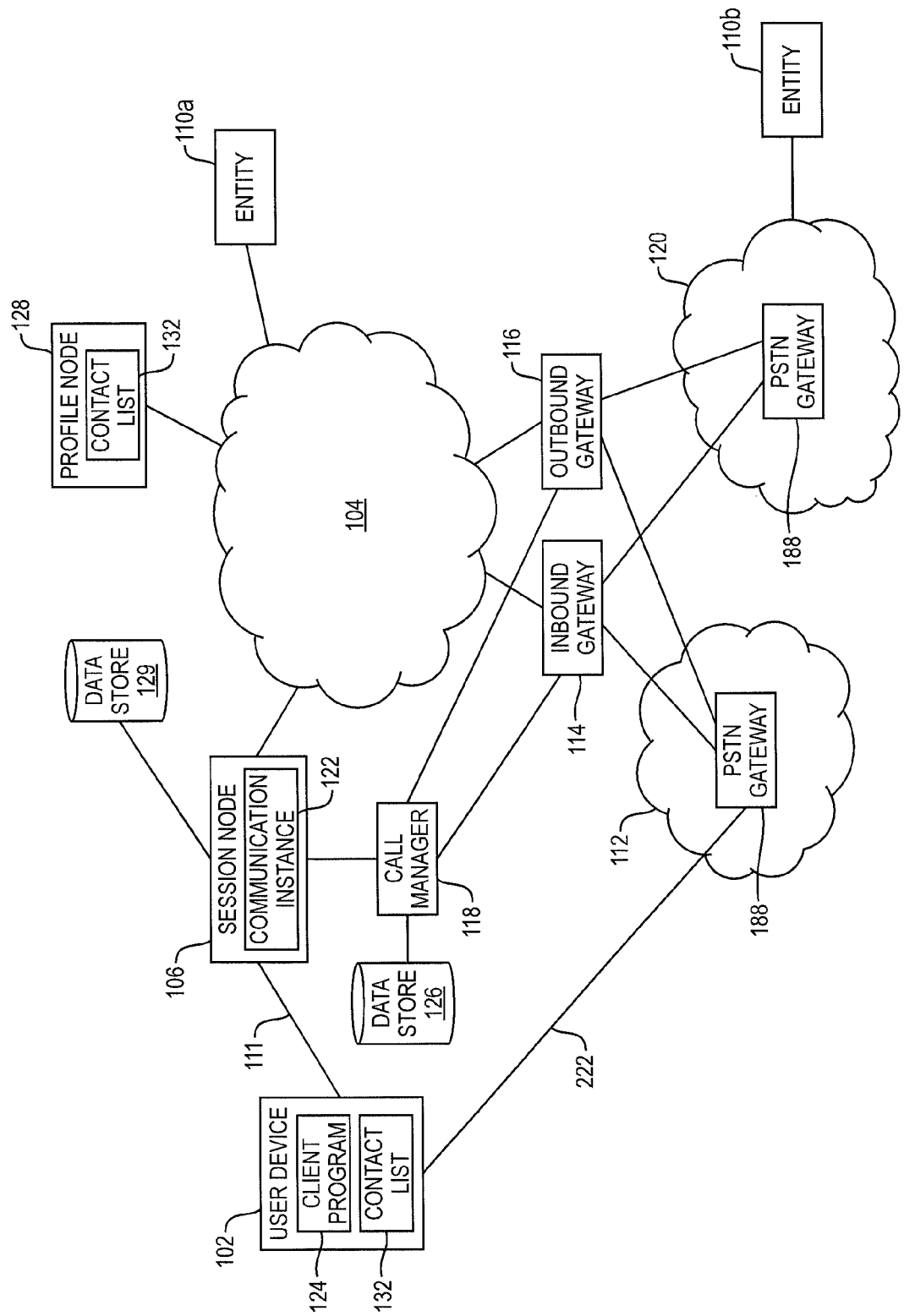
FIG. 1 is a schematic representation of a communication network in accordance with an embodiment of the invention.

Reference will first be made to FIG. 1, in which is shown a communication network 100, including a packet switched communication system 104 and circuit switched networks 112 and 120. In one embodiment the packet switched communication system 104 may be a peer to peer system operating on a packet switched network such as the internet. The circuit switched networks 112, 120 may be PSTN (Public Switched Telephone Network) networks.

A user device 102 is shown to be connected to the peer to peer system 104 via a session node 106. The user device 102 is also connected to the PSTN network 120. In one embodiment of the invention the user device is connected to the PSTN network 112 via a circuit switched connection 222 and to the session node 106 via a packet switched connection 111. The circuit switched connection 222 and the packet switched connection 111 may be provided by a GSM (Global System for Mobile Communications) network (not shown). For example the packet switched connection may be provided by a GPRS (General Packet Radio Service) connection of the GSM network whilst the circuit switched connection may be provided by a GSM audio connection of the GSM network. In a preferred embodiment of the invention the packet switched connection 111 is used to transmit packet data according to an internet protocol such as Transmission Control Protocol (TCP).

The user device 102 may be, for example, a personal computer, a gaming device, a personal digital assistant, a suitably enabled mobile phone, or other device able to connect to the internet.

The session node 106 may be grouped with other session nodes (not shown) in a cluster. A cluster consists of multiple stand alone session nodes providing a set of predefined services. A directory (not shown) may be provided for connecting the user device to an appropriate session node within the cluster. The method of allocating a session node in a cluster to perform a task is known in the art and will not be described in any more detail.

In accordance with an embodiment of the invention the session node 106 runs a communication instance 122 defining a session dedicated to a user of the user device 102. The communication instance 122 enables the user of the user device 102 to communicate across the communication network 100 to establish a connection with another device enabled to communicate via the peer to peer system 104. The session node 106 is able to run a plurality of communication instances for a number of concurrent user devices (not shown).

As shown in FIG. 1 the peer to peer system on the internet 104 comprises an inbound gateway 114 and an outbound gateway 116. The inbound gateway 114 and the outbound gateway 116 are connected to PSTN gateways 188 located in the PSTN networks. The inbound gateway 114 is arranged to receive data for the peer to peer system on the internet 104 from the PSTN gateways 188. The outbound gateway 116 is arranged to transmit data from the peer to peer system on the internet 104 to the to the PSTN gateways 188.

Also shown in FIG. 1 is a profile node 128. The profile node 128 is responsible for storing user profile information for users of the peer to peer system. The user profile information includes login information for logging into the peer to peer system and a contact list 132 associated with each user of the peer to peer system. The contact list 132 comprises the addresses of, for example, other users of the communication system stored as contacts by a user.

The user device 102 runs a client software program 124 that provides a client interface on the user device and allows the user of the user device 102 to communicate with the communication instance 122 running on the session node 106.

The client program 124 running on the user device has a number of different components or layers for implementing various functions, including a protocol layer 402 (FIG. 2a) for managing the interface with the GSM network. The interface with the GSM network will be described hereinafter with reference to FIG. 2b.

Figure 2A:
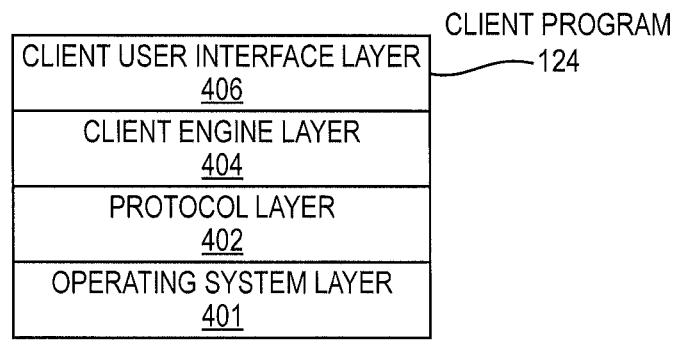
FIG. 2a is a diagram showing the protocol stack of a client program in accordance with an embodiment of the present invention.

FIG. 2a shows a protocol stack for the client program 124 according to an embodiment of the present invention. The protocol stack shows an operating system layer 401, a protocol layer 402, a client engine layer 404 and a client user interface layer 406. Each layer is responsible for specific functions. Because each layer usually communicates with two other layers, they are regarded as being arranged in a stack as shown in FIG. 2a. The operating system layer 401 manages the hardware resources of the user device 102 and handles data being transmitted to and from the session node 106. The operating system layer also handles the data being transmitted to and from the network 112. The client protocol layer 402 of the client software communicates with the operating system 401. Processes requiring higher level processing are passed to the client engine layer 404. The client engine 404 also communicates with the user client user interface layer 406. The client engine may be arranged to control the client user interface layer 406 to present information to the user via user interface means of the user device and to receive information from the user via the user interface means of the user device. The user interface means may comprise a speaker, a microphone, a display screen and a keyboard. This list is not exhaustive.

Figure 2B:
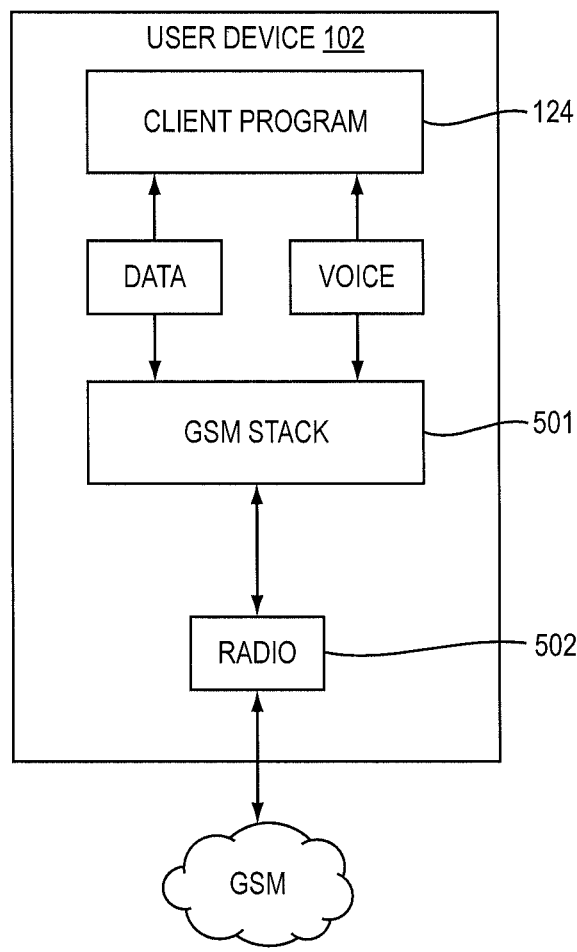
FIG. 2b is a diagram of a user device in accordance with an embodiment of the present invention.

FIG. 2b is a schematic diagram showing the transmission of data between the client protocol stack and the GSM protocol stack in the user device 102. As shown in FIG. 2b the user device 102 further comprises a GSM protocol stack 501 and a radio transceiver 502. Information transmitted from the GSM network to the user device is received by the transceiver 502. The data received from the GSM network is processed by GSM protocol stack 501 before it is transmitted to the client program 124. Similarly, information to be transmitted to the GSM network from the client program 124 is processed by the GSM protocol stack 501 before it is transmitted to the GSM network via the transceiver 502. The operation of the GSM protocol stack 501 is known in the art and will not be described in detail herein.

Figure 3:
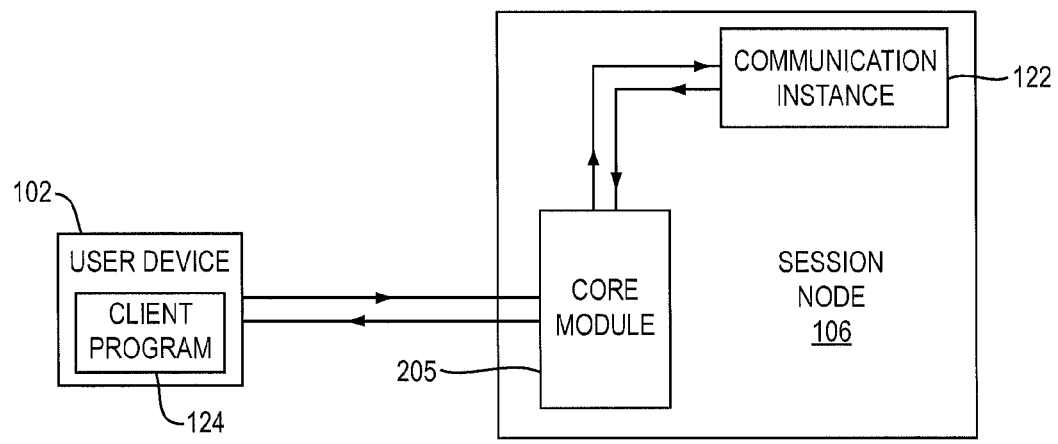
FIG. 3 is a schematic representation of part of the communication network shown in FIG. 1.

The communication instance 122 running on the session node 106 manages the communication between the client program 124 running on the device 102 and the peer to peer system on the internet 104. FIG. 3 shows the connection path between the communication instance 122 on the session node 106 and the client program 124 running on the user device 102.

As shown in FIG. 3, the session node 106 further comprises a core module 205 for allocating a communication instance 122 to a client program 124. In accordance with an embodiment of the invention, when a client program 124 transmits a login request to the session node 106, as described hereinafter, the core module 205 is arranged to assign a communication instance 122 to the client program 122. According to one embodiment of the invention the communication instance 122 may be selected from a pool of available communication instances. In accordance with an alternative embodiment of the invention the communication instance may be created when the client program 124 logs in.

According to one embodiment of the invention the protocol layer 402 of the client 124 will use a different protocol to the protocol used within the communication instance 122. According to this embodiment of the invention the communication instance includes protocol adaptor to facilitate communication between the client program and the communication instance 122.

Figure 5:
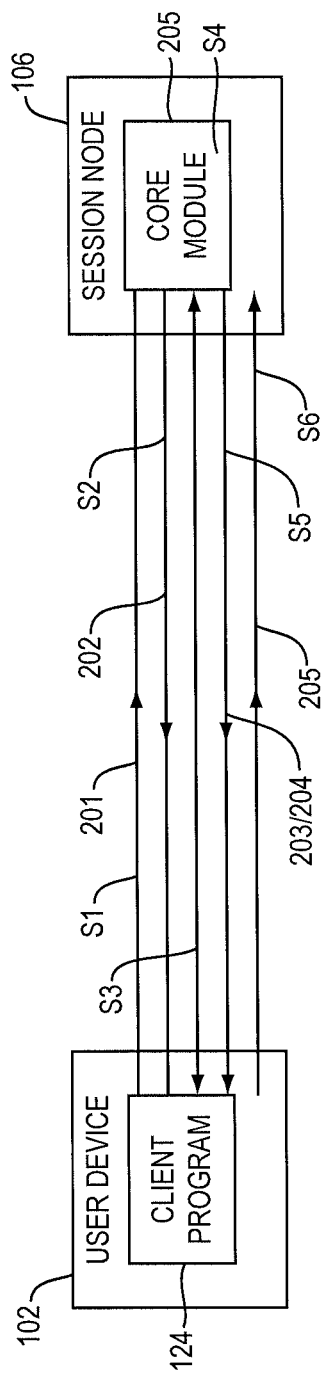
FIG. 5 is a schematic representation of part of the communication network shown in FIG. 1.

In accordance with an embodiment of the invention the client program 124 running on the user device 102 is arranged to set up a connection with the session node 106. FIG. 5 shows the method steps in accordance with an embodiment of the invention for setting up a connection with a session node 106.

In step S1 the client program 124 transmits a data packet 201 to the session node 106 to request a connection to the session node 106. If the client program has connected to a session node previously it will attempt to connect to the session node it was previously connected to. If this is the first time that the client program 124 has attempted to connect to a session node, or if the session node it was previously connected to does not respond, the client 124 will attempt to connect to a predefined root session node. The root session node is defined by a name that is IP address independent.

In one embodiment of the invention the data packet 201 is sent unencrypted on the data connection 111. Accordingly the data packet 201 sent in step S1 should not contain sensitive information. The data packet 201 may however include information that may be used for encryption methods to establish a secure connection between the user device 102 and the session node 106.

In step S2, in response to receiving the network connection request in data packet 201 the core module 205 of the session node 106 transmits a data packet 202 to the client program acknowledging the network connection request. The data packet 202 may contain information that may be used for encryption methods to establish a secure connection between the user device 102 and the session node 106. In a preferred embodiment of the invention the data packet 202 includes an identifier indicating the identity of the session node. The client program on the user device 102 may verify the identity of the session node using an authentication method.

In step S3 a secure connection between the session node 106 and the client program 124 is established using an encryption method.

In step S4 the session node 106 determines whether it should establish a connection between the client program 124 and the peer to peer system 104, or whether the connection should be handled by another session node in the session node cluster. The decision to handle the connection or to redirect the client program to another session node is made to balance the number of client programs being handled by each session node in the cluster. For example the client program may be redirected to connect to another session node if the session node 106 is currently handling a threshold number of client programs. Alternatively the session node 106 may redirect the client program to another session node if the session node 106 determines that it is handling more client programs than being handled by another session node.

If the session node 106 determines that it should handle the connection between the client program 124 and the peer to peer system 104 in step S5 the session node 106 sends a data packet 203 to the user device 102 to confirm that it will handle the connection. The data packet 203 may include the attributes listed in table 1:

TABLE 1

| KEY | TYPE | ATTRIBUTE |
|---|---|---|
| CHUNKTYPE | integer | CONNECTED |
| CLIENT_PUBLIC_IP_ADDRESS | address | clients IP address as seen by session node |
| LATEST_VERSION | string | newest version number |
| UPGRADEURL | string | URL where upgrades can be downloaded |

As shown in table 1 the data packet 203 contains a 'CONNECTED' attribute to indicate that the session node will handle the connection between the client program and the peer to peer system 104. The data packet further contains an attribute indicating the latest version number of the client program that is available to run on the user device. The data packet 203 may also indicate the URL (Uniform Resource Locator) from where the latest version of the client program may be downloaded.

However if the session node 106 determines at step S4 that another session node should be used to establish the connection between the user device 102 and the peer to peer system, in step S5 the session node 106 sends a data packet 204 to the user device 102 to redirect the client 124 running on the user device 102 to another session node. The data packet 204 may include the attributes listed in table 2:

TABLE 2

| KEY | TYPE | ATTRIBUTE |
|---|---|---|
| CHUNKTYPE | integer | REDIRECT |
| NEW_SESSION NODE | ipaddress | new session node IP address and port number |
| LATEST_VERSION | string | newest version number |
| UPGRADEURL | string | URL where upgrades can be downloaded |

As shown in table 2 the data packet 204 sent to the user device 102 to redirect the client program 124 to another session node may include an IP address and port number of the session node the client program is redirected to. On receipt of the data packet 204 the client program 124 is arranged to close the TCP connection with the session node and to restart the connection method from step S1 using the new IP address and connection port.

Additionally the data packet 204 may indicate the latest version number of the client program that is available to run on the user device. In a preferred embodiment of the invention the data packet 204 may also indicate the URL (Uniform Resource Locator) from where the latest version of the client program may be downloaded. This allows the user device to download the latest version of the client program before the user device connects to the other session node identified in the redirect message 204. In one embodiment of the invention the client program is arranged to automatically download the latest version without requiring instructions from the user of the user device 102.

In step S6, in response to receiving the data packet 203 indicating that session node 106 will handle the connection between the client program 124 and the peer to peer system 104, the client program 124 sends the session node 106 data relating to the user device 102 in data packet 205. The data packet 205 may include the attributes listed in table 3:

TABLE 3

| KEY | TYPE | ATTRIBUTE |
| --- | --- | --- |
| CHUNKTYPE | integer | CLIENTDATA |
| CLIENT_IP_ADDRESS | address | device IP address |
| DEVICE_PSTNNUMBER | string | device PSTN number in international notation. |

As shown in table 3, the data packet 205 includes an attribute defining an IP address of the user device and an attribute defining a PSTN number of the device. The IP address of the device identifies the user device 102 in the packet switched network provided by the internet. Similarly the PSTN address identifies the user device 102 in the PSTN network 112.

Once the client program has verified any credentials of the session node sent in the data packet 203, the client program 124 has a secure connection to a session node 106 that the client program knows the identity of. The client program may then log into the peer to peer system via the session node 106. On login the core module 205 will assign a dedicated communication instance 122 to the client program 124. This defines the start of a session between the client program and the session node 106.

Figure 6:
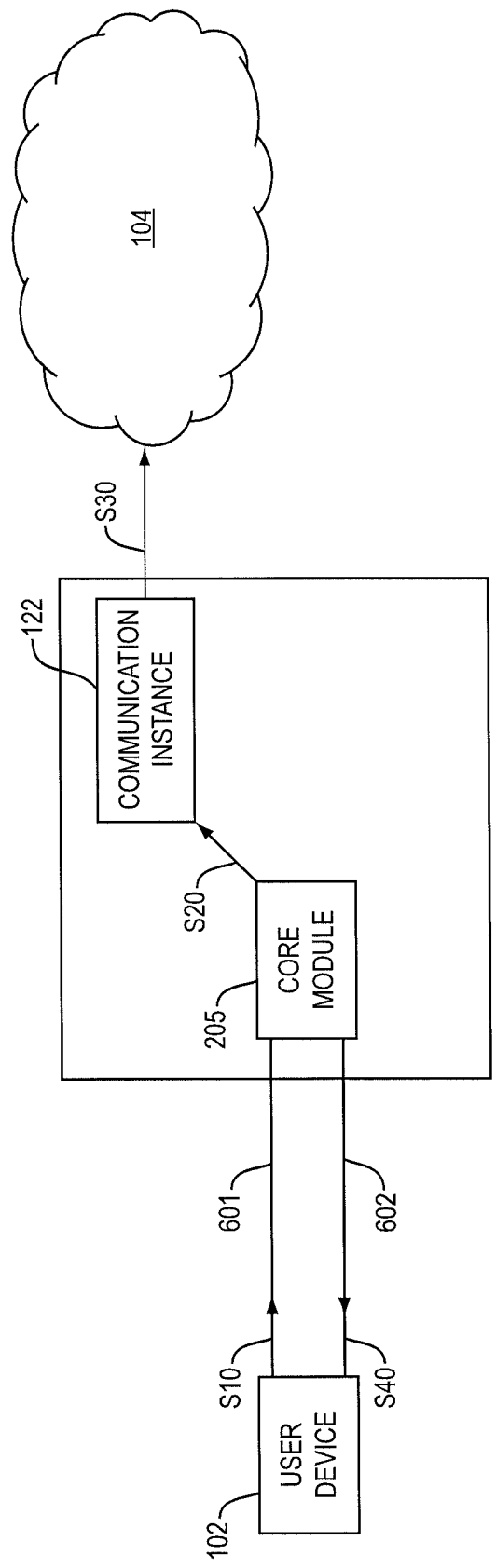
FIG. 6 is a schematic representation of part of the communication network shown in FIG. 1.

The method steps for logging into the peer to peer system via the session node 106 and starting a session defined by a communication instance 122 will now be described in relation to FIG. 6. The steps shown in FIG. 6 are also followed when the client program 124 wishes to re-establish a connection to an existing session.

In step S10 the client program is arranged to send a data packet 601 to the session node 106. According to an embodiment of the invention the attribute container of data packet 601 includes the attributes listed in table 4. If the client is already logged into an existing session the attribute container will include a further attribute defining the identifier for the session that the client was previously logged into. If the client does not currently have a session running on the session node the attribute defining the session ID will either not be included in the data packet 601 or the attribute content will be empty.

In an embodiment of the invention the attribute container of the data packet 601 will contain attributes defining the login name and login password for the user of the client program 124.

In a further embodiment of the invention the attribute container of the data packet 601 will contain at least one attribute identifying the user device 102. If the user device 102 is enabled to receive PSTN calls the identifier of the user device may be the PSTN number of the device 102. The PSTN number of the device may be provided in data packet 601 in addition to or as an alternative to providing the PSTN number of the device in data packet 205 as described previously.

TABLE 4

| KEY | TYPE | ATTRIBUTE |
| --- | --- | --- |
| CHUNKTYPE | integer | LOGIN |
| SESSION_ID | binary | session identifier for client, does not exist or is empty if client does not have a session yet |
| NAME | string | username for logging in |
| PASSWORD | string | password for logging in |
| DEVICE_PSTNNUMBER | string | device own pstn number |

In one embodiment of the invention the login username and login password will always be included in the login request data packet 601, even if the user has an existing session running on the session node 106. In this embodiment of the invention, although the client device has already logged in to an existing session it may be necessary to assign a new communication instance defining a new session for the client 124 if the existing session cannot be located by the core module 205.

If the attribute container of data packet 601 contains an attribute defining a session identifier, the core module 205 will search for a communication instance corresponding to the existing session for the client. In step S20, if the core module 205 cannot find the session having the defined session identifier, or if the data packet 601 does not contain a session identifier, the core module 205 is arranged to assign a new communication instance 122 to the client program 124 and create a new session having a new session identifier. In step S30 the communication instance 122 is then arranged to sign into the network 104 using the login name and password provided in the data packet 601.

In step S40 the core module 205 is arranged to transmit a data packet 602 to the client. In an embodiment of the invention the attribute container of the data packet 602 comprises the attributes listed in table 5.

TABLE 5

| KEY | TYPE | ATTRIBUTE |
| --- | --- | --- |
| CHUNKTYPE | integer | LOGGEDIN |
| SESSION_ID | binary | session identifier for client |

The attribute container of data packet 602 will include an attribute indicating to the client program 124 that it is logged in to the peer to peer system. The attribute container of the data packet 602 will also contain an attribute that defines the session identifier corresponding to the session started by running the communication instance 122 dedicated to the client 124.

According to an embodiment of the invention the session identified by the session identifier included in the data packet 602 is independent of the connection between the session node 106 and the client program 124. If the connection between the session node and the client is terminated the client may present the session identifier to the session node when reconnecting to the session node. According to this embodiment of the invention the communication instance dedicated to the client program 124 may remain logged into the peer to peer system when the connection between the session node 106 and the client program is terminated.

Accordingly, in one embodiment of the invention the connection between the client 124 and the session node 106 is a non persistent connection.

In one embodiment of the invention the connection is between the client and the session node is terminated after each packet exchange.

In one embodiment of the invention the client 124 is arranged to terminate the connection with the session node 106 after a predetermined time has lapsed since a data packet was exchanged with the session node 106.

In a further embodiment of the invention the session node 106 is arranged to terminate the connection with the client program 124 after a predetermined time has lapsed since the data packet was exchanged with the session node 106. If the session node closes TCP connection, before closing the TCP connection the session node will send a data packet containing an attribute indicating that the session node is disconnecting. The client program may be arranged to close the TCP connection after a predetermined time of receiving this data packet. For example the client program 124 may be arranged to close the TCP connection 3 seconds after receiving the disconnect data packet from the session node.

Once the client program 124 running on the user device 102 is logged into the peer to peer system, the session node 106 provides the client program with profile data received from the profile node 128. The profile data may be sent in response to a profile data request that is sent from the client program to the session node 106.

The communication instance 122 associates the identity of the user of the user device as defined by at least part of the login details of the user with the identity of the device as defined by the IP address and the PSTN number of the device. In one embodiment of the invention the communication instance may store the identity of the user together with the identity of the user device in a data store 129 associated with the session node 106.

According to an embodiment of the invention it is possible for the user of the user device to log into the peer to peer system using more than one user device. According to this embodiment of the invention the communication instance will associate the identity of each device with the identity of the user in the peer to peer system.

Once the session node 106 has assigned a communication instance 122 to the user of the user of the user device 102 the communication instance 122 will provide the client program 124 with data to enable to the client program 124 to establish a communication event with an entity in the communication system 100.

The entity may be any node in the communication system 100 that is capable of receiving information from the user device or transmitting information to the user device 102. For example the entity may be another user device or a node in the communication system 100. The entity may correspond to voice mail records, or other data records associated with the user of the user device. Additionally an entity may be a node arranged to carry out control commands in the network.

An entity is located by an address in the network in which it resides. The address of an entity that resides in the internet may be for example an IP address, a URI (Uniform Resource Indicator), a username, or a VoIP device. The address of an entity that resides in the PSTN network may be the PSTN number associated with the entity.

In one embodiment of the invention the entity may correspond to more than one end point in the communication network 100. For example the entity may be a user that is logged into the peer to peer system of the internet using two or more user devices. In this case an entity will have more than one associated address.

In accordance with an embodiment of the invention the user device 102 may establish a communication event with an entity via more than one network of the communication system. For example the user device 102 may establish a call to an entity connected to the internet using the PSTN network 112.

In order to establish a communication event with an entity over more than one network it is necessary to identify the entity in each network.

In accordance with an embodiment of the invention the communication instance 122 is arranged to allocate an entity an identity that may be transmitted and interpreted by both the PSTN network and the peer to peer system on the internet. In this case the identity of the entity may be resolved to the address of the entity by a node located in the internet. In a preferred embodiment of the invention the allocated identity is a PSTN number.

For example, if the entity is located in the internet, the IP address of the entity in the internet will not be recognized by the PSTN network. According to an embodiment of the invention the communication instance 122 is arranged to allocate a PSTN number to the entity that may be used to establish a call to the via the PSTN network. The allocated PSTN number may then be resolved to the IP address, or username of the entity at a node located in the internet.

As shown in FIG. 1 a call manager 118 is connected to the session node 106, the inbound gateway 114 and the outbound gateway 116. The call manager has access to a data store 126. In FIG. 1 the data store 126 is shown as being associated with the call manager 118.

Figure 8:
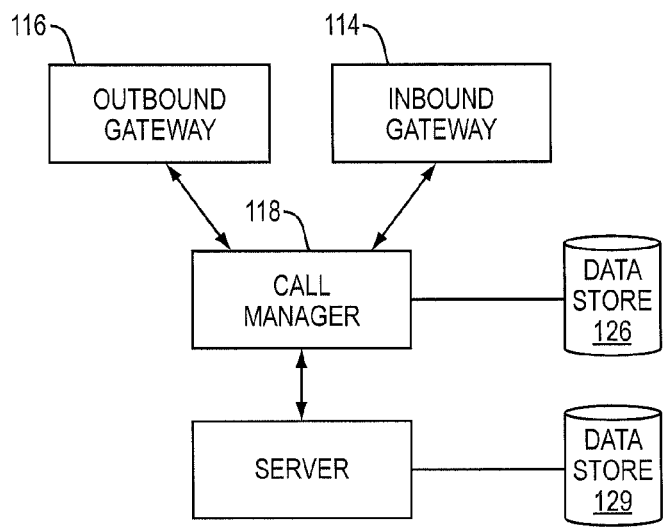
FIG. 8 is a schematic representation of logical connections between components of part of the communication network shown in FIG. 1.

In the embodiment shown in FIG. 1 the call manager 118 is shown as being located separately from the session node 106 and the gateways 114 and 116. In alternative embodiments the call manager 118 may however form part of either the session node 106 or of one of the gateways 114 or 116. The logical connections between the call manager, the session node, the inbound gateway and the outbound gateway are shown in FIG. 8.

The call manager 118 is arranged to provide the communication instance 122 with a PSTN number to be allocated to an entity in response to a request from the communication instance. The communication instance is arranged to allocate the PSTN number to the entity and to provide the address of the entity to the call manager. The call manager is arranged to store the allocated PSTN number in the data store 126 together with the address of the entity.

In a preferred embodiment of the invention the address of an entity is determined by the communication instance from the contact list 132 provided from the profile node 128. This embodiment of the invention will be described with reference to FIG. 4.

Figure 4:
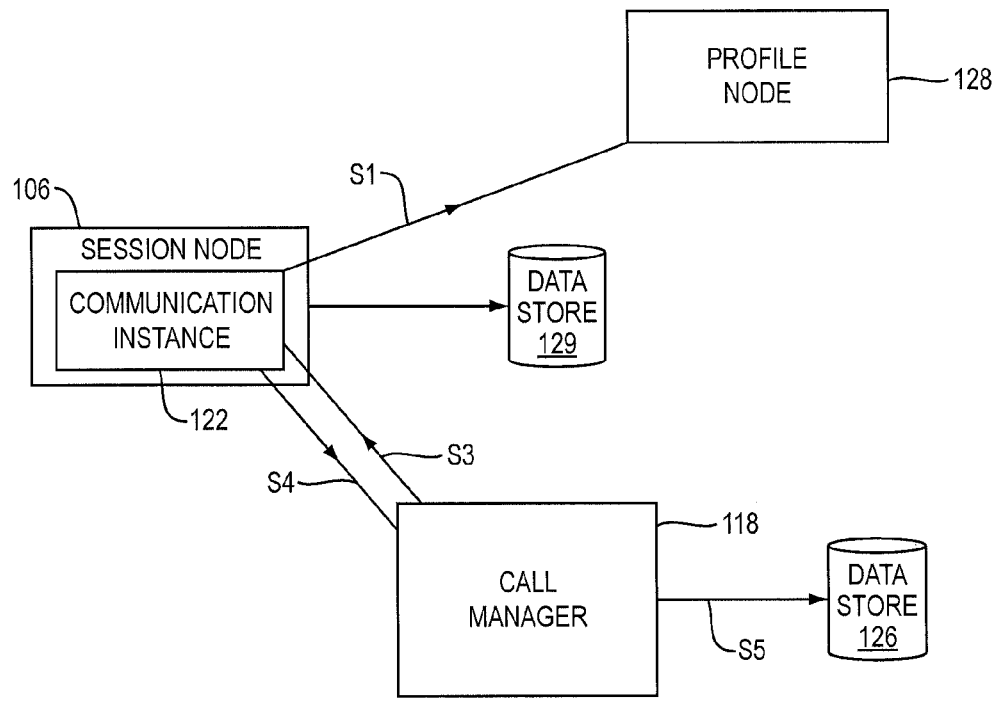
FIG. 4 is a schematic representation of part of the communication network shown in FIG. 1.

FIG. 4 is a diagram showing the steps for allocating an entity a PSTN number in accordance with a preferred embodiment of the invention.

In step S1 the communication instance 122 is arranged to retrieve the addresses of the entities of that are listed as contacts in the contact list 132 associated with the user of the user device 102. The addresses of the entities are retrieved from the profile node 128.

In step S2 the communication instance stores the address of each entity in the data store 129. In a preferred embodiment of the invention the entire contact list 132 is stored in the data store 129.

In step S3 the communication instance 122 is then arranged to retrieve a PSTN number for each entity listed in the contact list from the call manager.

In Step S4 the communication instance is arranged to allocate each PSTN number to each entity listed in the contact list and to report the address of each entity to the call manager 118, together with an indication of which PSTN number has allocated to which entity.

In step S5 the call manager 118 the communication instance is arranged to store in the data store 126 a PSTN number in association with for each entity listed in the contact list.

In one embodiment of the invention the call manager is arranged to additionally store in the data store 126 the PSTN number of the user device 102 in association with the PSTN number allocated to the entity. The PSTN number of the device may be reported to the call manager in either step S3 or step S4 by the communication instance. In this embodiment of the invention the address of the entity may be resolved using the PSTN number allocated to the entity and the PSTN number of the device. In this case one PSTN number may be allocated for use by more than one user.

The contact list 132 together with the PSTN numbers allocated to each entity in the contact list are transmitted from the communication instance to the client program 124.

In a preferred embodiment of the invention the allocated PSTN numbers and the contact list 132 are transmitted to the client program 124 in data packets via the data connection 111. The allocated PSTN numbers may be provided in a separate data packet from the contact list 132.

At least part of the PSTN numbers may be provided to the client program in a 'call set up' data packet comprising the attributes listed in table 6

TABLE 6

| KEY | TYPE | ATTRIBUTE |
| --- | --- | --- |
| CHUNKTYPE | integer | CALLSETUP |
| CALLMETHOD | integer | a numeric value identifying calling method to use |
| DIALIN_NUMBER_PREFIX | string | first number in dial-in number range, for example "+3725521000" |
| DIALIN_NUMBER_RANGE_SIZE | integer | # of numbers in dial-in block, for example 1000 |
| VOICEMAIL_NUMBER_PREFIX | string | dial-in number range for listening voicemails |
| VOICEMAIL_NUMBER_RANGE_SIZE | integer | # of numbers in voicemail number block |

In one embodiment of the invention each PSTN number for calling an entity may be listed separately in the data packet. However in a preferred embodiment, each PSTN number may be determined by the client program 124 from a first number corresponding to a 'DIAL IN NUMBER PREFIX' and a second number corresponding to an index number identifying the contact in the contact list (see table 7. The index number will fall within the number range, referred to as the 'DIAL IN NUMBER RANGE' as shown in table 6

The index number for each contact is transmitted in the contact list from the communication instance 122 to the client program 124.

Table 7 shows the attributes of the data packet containing the contact list 132. Each entity in the contact list is given an index value starting from 1. The attribute container containing the contact list may further include the contacts username, or URI for contacting the contact using the peer to peer system, and the name of the contact.

TABLE 7

| KEY | TYPE | ATTRIBUTE |
| --- | --- | --- |
| CHUNKTYPE | integer | ENTITY |
| ENTITYINDEX | integer | entity index value, starting from 1 |
| USERNAME | string | entity username |
| FULLNAME | string | |
| PSTNNUMBER | string | |

The client program 124 may map the PSTN number to each entity in the contact list by arithmetically adding the first number to the index for the entity. For example if the first number is defined as:

+3725521020 and the index for an entity is:

33 the PSTN number mapped to the entity will be:

+3725521053

Alternatively the client program may map the PSTN number by appending the index to the first number. For example, if the first number is:

+37255210 and the index corresponding to an entity is:

33 the PSTN number mapped to the entity will be:

+3725521033

Alternatively if the PSTN numbers are provided as a list of entire PSTN numbers the position number of the PSTN number in the list may be mapped to an entity having a corresponding index.

In an embodiment of the invention a predefined PSTN number, or index is reserved for communication events that occur with entities that are not listed in the contact list. In a preferred embodiment of the invention the index '0' is reserved for entities that are not listed on the contact list.

In one embodiment of the invention the call method attribute referred to in table 6 may indicate how the PSTN number should be determined from the information provided in the data packets. For example, the call method may specify whether the PSTN number should be determined by arithmetically adding the index to the first number, or by appending the index to the first number, or whether the entire PSTN numbers are listed in the data packet.

Figure 9:
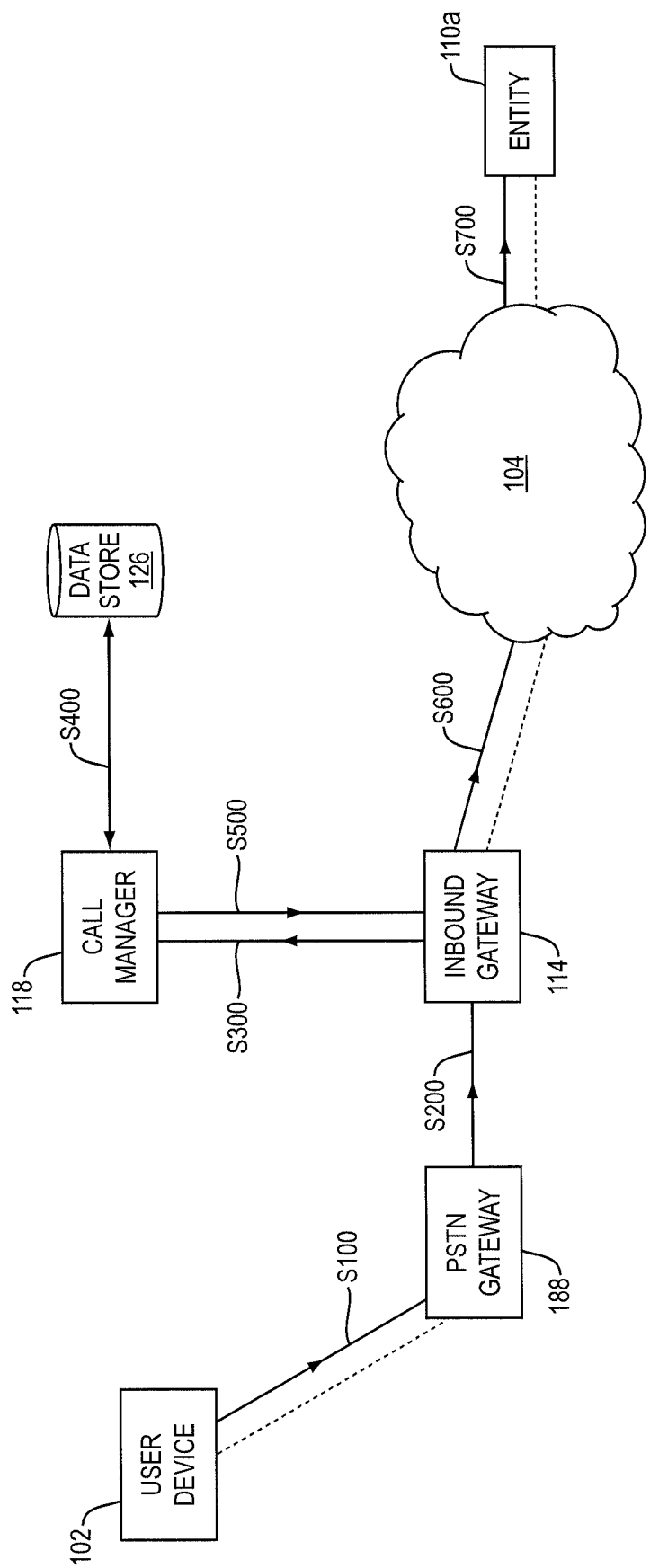
FIG. 9 is a diagram showing the initiation of a call in accordance with an embodiment of the present invention.

In one embodiment of the invention the call method attribute may specify whether or not the identity of the user device 102 is required as part of the control data when initiating a call to an entity. FIG. 9, described hereinafter, illustrates how the address of a called entity may be determined from the allocated PSTN number together with the identity of the user device. As such one PSTN number may be allocated to different entities when called from different user devices. In this case the identity of the user device is required when placing a call. Alternatively only one PSTN number may be allocated to one entity at a time. In this case the identity of the user device is not required when placing a call.

In some countries it may be a requirement for one PSTN number to directly correspond to one entity. In this case the call manager may determine the location of the user device associated with the communication instance and in step S3 of FIG. 4 only provide the communication instance with PSTN numbers that are not currently allocated. The location of the device may be determined from the IP address of the user device that may be reported from the user device to the call manager via the communication instance.

It may also be necessary to set the call method attribute in dependence on the capability of the user device. For example some user devices may not have the capability to determine the PSTN number from a first number and a separate index. In this case it is necessary to send the allocated PSTN numbers to the device as a list of entire PSTN numbers. Furthermore new calling methods may be introduced that are not supported by previous software versions running on the user device. The capability of the user device may be determined from an indication of the type of user device, for example a model type. The indication of the type of user device may be reported by the device to the communication instance. The call manager may then select a calling method from that both the user device and the session node can support.

The call manager 118 is arranged to map the PSTN number to the address of the entity in a manner which corresponds to the mapping carried out in the client program as defined by the call method. It may therefore be necessary to store the call method at the data store 126 such that the call manager can map the PSTN number to the entity in a manner that corresponds to the call method implemented at the user device.

Accordingly, the PSTN number allocated to an entity may be determined at the client program 124, the communication instance 122 and the call manager 118.

Tables 8 and 9 define the set of attributes that may be contained in the attribute container of a data packet to make changes to the user's contact list in accordance with embodiments of the invention. For example the client is arranged to add a contact to the contact list by sending a data packet containing the attributes listed in table 8. In response, the communication instance running on the session node is arranged allocate a PSTN number to the new contact and to store the address of the contact, for example the PSTN number or username of the contact in association with the allocated PSTN number. The session node 106 may then reply with a data packet indicating the contact list update which contains an index value for the new contact.

TABLE 8

| KEY | TYPE | ATTRIBUTE |
| --- | --- | --- |
| CHUNKTYPE | integer | ADDCONTACT |
| SKYPENAME | string | skype name |
| FULLNAME | string | full name |
| PSTNNUMBER | string | Pstn number of contact |

The client may delete an entity from the contact list by sending a data packet containing the attributes listed in table 9. In response the session node is arranged to reply with a data packet indicating the contact list update with the deleted entity marked as deleted so that client knows to remove it from its list stored on the user device 106.

TABLE 9

| KEY | TYPE | ATTRIBUTE |
| --- | --- | --- |
| CHUNKTYPE | integer | DELETECONTACT |
| BUDDYINDEX | integer | Entity index value, starting from 1 |

In accordance with an embodiment of the invention the user device 102 may establish a call to an entity located in the communication network 100 via the PSTN network using the PSTN number allocated to the entity. The user device 102 may also receive calls from an entity located in the communication network via the PSTN network.

Figure 7:
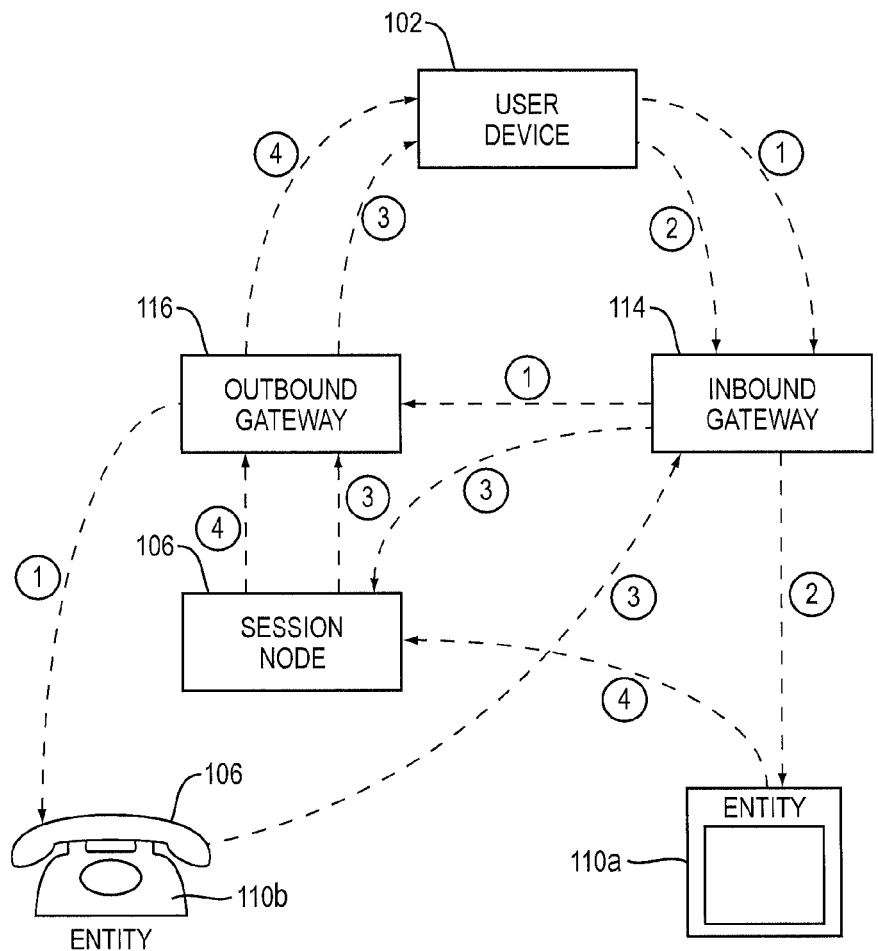
FIG. 7 is a schematic representation of call connections in accordance with an embodiment of the present invention.

FIG. 7 shows the call connections made when placing calls between the user device 102 and entities located in the communication network. More specifically FIG. 7 shows the following call connections:

(1) an outbound call from the user device 102 to an entity 110b located in the PSTN network;

(2) an outbound call from the user device 102 to an entity 110a located in the internet 104;

(3) an inbound call to the user device 102 from an entity 110b located in the PSTN network; and (4) an inbound call to the user device 102 from an entity 110a located in the PSTN network.

As shown in FIG. 7, outbound calls made from the user device 102 to an entity are routed to the inbound gateway 114. The inbound gateway is then able to determine the address of the entity by querying the data store 126 via the logical connections illustrated in FIG. 8. The method of calling an entity from the user device 102 will now be describe in detail in relation to FIG. 9.

A call comprises both a media data connection and a control data for handling the call set up. In FIG. 9 the control data connection for transmitting control data and the media data connection for transmitting the media data are shown separately. The control data connection is shown as a solid line and the call connection is shown as a broken line.

In step S100 the user of the user device 102 initiates a call to an entity listed in the contact list 132. The contact list 132 may be displayed by the user interface layer of the client program 124 as selectable links on a display of the user device 102. The user may initiate a call to the entity by selecting a link for that entity. When the user initiates the call the client program 124 is arranged to dial the PSTN number allocated to that entity. The call placed by the client program 124 will therefore include control data that defines the allocated PSTN number. The control data will also include the PSTN number of the user device 102. The dialed PSTN number allocated to entity is used to establish a media data connection and control data connection with the PSTN gateway 188 via the GSM audio connection 222.

In step 200 the media data connection is held at the PSTN gateway 188. The PSTN gateway 188 is arranged to transmit the control data to the inbound gateway located in the internet 104. The PSTN gateway 188 is arranged to transmit control data comprising recognised PSTN numbers to the inbound gateway 114. The PSTN gateway may recognise numbers that have been provided for use by the call manager 118 by the operator of the PSTN network.

In step S300 the inbound gateway 114 transmits the control data comprising the allocated PSTN number of the called entity and the PSTN number of the user device to the call manager 118. The media data connection is held at the PSTN gateway 188 until the allocated PSTN number of the called entity is resolved to the address of the entity.

At step S400 the call manager 118 uses the PSTN number of the device 102 to search the data store 126 for the contact list 132 associated with the user of the device 102. The PSTN allocated to the entity is then used to locate the address of the entity as defined in the contact list 132. In one embodiment of the invention the call manager may also retrieve the username of the user associated with the user of the user device 102.

In step S500 the address of the entity is transmitted to the inbound gateway 114. The call manager 118 may also transmit the username of the user of the user device 102 to the inbound gateway 114.

In step S600 the inbound gateway 114 accepts the media data from the PSTN gateway and uses the address of the entity received from the call manager 118 to transmit the call via the packet switched network 104. If the address of the entity is located in the PSTN network the inbound gateway will transmit the call to the PSTN network via the outbound gateway 116 (shown in FIG. 1).

In step S700 the call is received at the called entity, e.g. device 110a or 110b. If the called entity is located in the internet 104 the username of the user of the device 102 retrieved in step S500 may be displayed on the device 110a to indicate the origin of the call.

Figure 10:
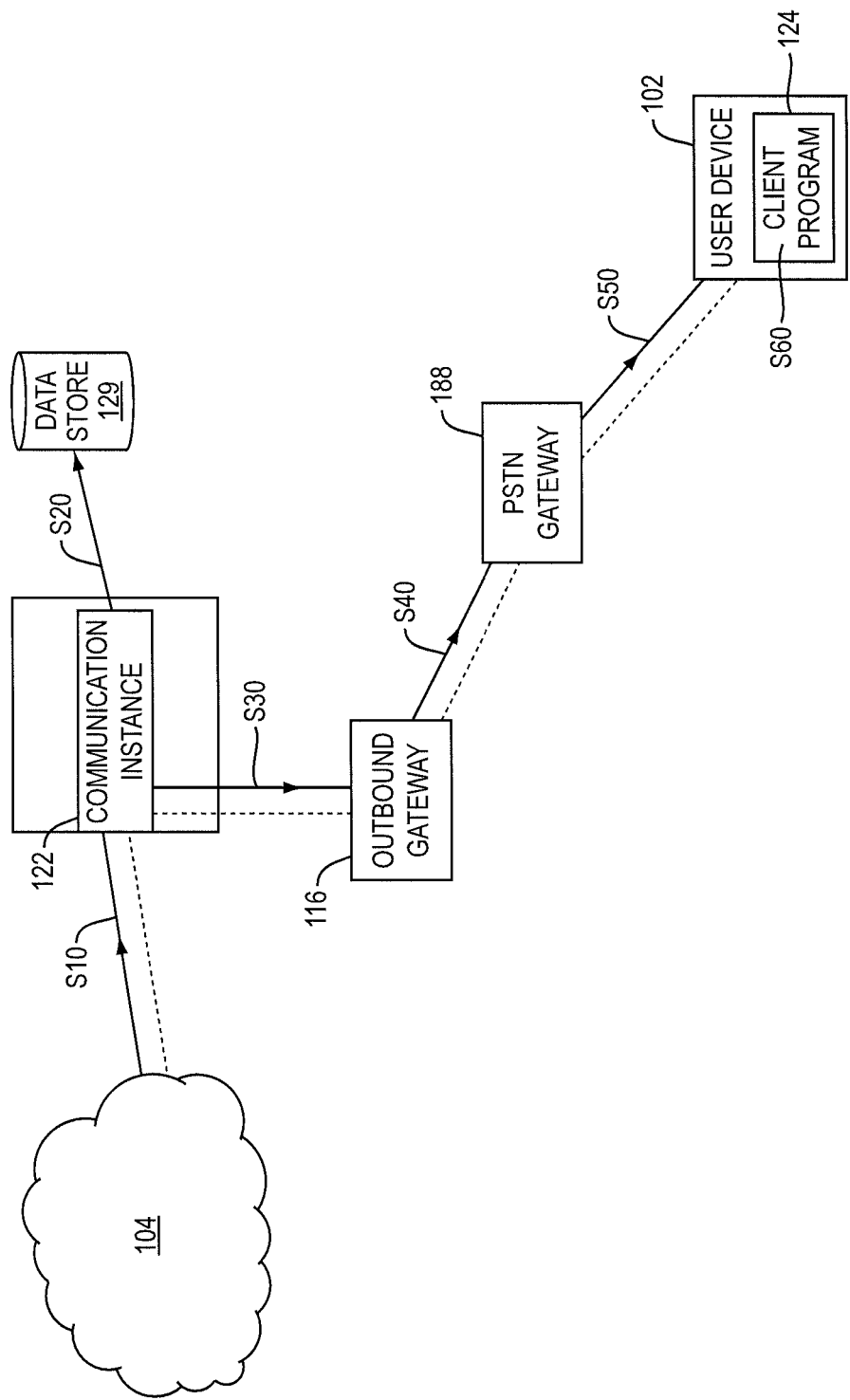
FIG. 10 is a diagram showing the reception of a call in accordance with an embodiment of the present invention.

Reference will now be made to FIG. 10 to describe how a call from an entity in the communication system 100 is transmitted to the user device 102 via the PSTN network.

FIG. 10 is a diagram illustrating the reception of a call at the user device 102. In FIG. 10 the control data connection for handling the call set up and the media data connection for transmitting the media data are shown separately. The control data connection is shown as a solid line and the media data connection is shown as a broken line.

The call may originate from an entity located in the packet switched network 104 or from an entity located in the circuit switched network 112. The following method will be described the case where a call is initiated from an entity located in the internet 104.

In step S10, an incoming call from the packet switched network 104 is received at the communication instance 122 running on the session node 106. The control data of the incoming call will identify the destination of the call with the username associated with user of the user device 102. The username of the user is used to locate the communication instance 122 in the peer to peer system on the internet 104. The control data may also identify the origin of the call by including username of the calling entity.

In step S20 the communication instance searches the data store 129 to determine the PSTN number of the device 102. The communication instance may also search the contact list 132 associated with the user of the device 102 to determine if the username of the calling entity matches an entity listed in the contact list 132. If calling entity is listed in the contact list 132, the PSTN number allocated to the calling entity will be retrieved from the data store 129. If the calling entity is not listed in the contact list the PSTN number reserved for entities not listed on the contact list will be retrieved.

In step S30, the control data connection comprising the PSTN number of the device 102 is transmitted, together with the media data connection, to the outbound gateway 116. The control data may also include the PSTN number retrieved from the data store 129 to identify the calling entity.

In step 40 the call is transmitted from the outbound gateway 116 to the PSTN gateway 188 using the PSTN number of the device. The PSTN number retrieved from the data store 129 to identify the calling entity is also transmitted with the call.

In step S50 the call is transmitted to the user device 102 via the PSTN network. The PSTN number retrieved to identify the calling entity is recognised by the PSTN network and may be transmitted by the PSTN network to identify the origin of the call.

If the calling entity has an allocated PSTN number, in step S60 the client program 124 running on the user device 102 is arranged to resolve the allocated PSTN number to the associated contact details of the entity provided in the contact list 132. This may be achieved by mapping the PSTN number of the calling entity to the username of the contact using the mapping method described previously. For example if the PSTN number associated with the calling entity is generated at the client program 124 using the index representing the entity, the client program may be arranged to subtract the first number from the PSTN number to derive the index and identify the contact. The username of the contact may then be displayed on the display of the user device to show that there is an incoming call from that contact.

Alternatively, if the reserved PSTN number was transmitted with the call to identify that the calling entity was not stored on the contact list 132, the client program 124 may be arranged to display the predefined text on the display of the user device which states that the caller is 'unknown'.

In an alternative embodiment of the invention the media data connection is not established via the communication instance 122 as shown in FIG. 10. Instead steps S10 to S30 may be used to set up the control data connection only. The media data connection may then be established between the outbound gateway and the calling entity after the control data connection is established.

In accordance with an embodiment of the invention the user of the user device 102 may terminate the session with the peer to peer system 104 by transmitting a logout request data packet from the user device 102 to the session node 106. The log out request data packet may include the attributes shown in table 10.

TABLE 10

| KEY | TYPE | ATTRIBUTE |
| --- | --- | --- |
| CHUNKTYPE | integer | LOGOUT |

In response to receiving the logout request data packet the session node 106 is arranged to remove the association of the user of the user device from the communication instance 122. In particular the session node 106 may notify the call manager to remove the association of the user device and the contact list 132 with the allocated PSTN numbers from the data store 126.

In one embodiment of the invention the address of an entity may specify the location of a voicemail record associated with the user, or the address of a control command located on a network node. These addresses may be provided in user's profile information available from the profile node 128.

In one embodiment of the invention the communication instance is arranged to provide information relating to the geographical location of the user device 102 to the call manager 118 when requesting a PSTN number. In this embodiment of the invention the call manager is arranged to provide the communication instance 122 with PSTN numbers that relate to PSTN gateways that are local to the user device, otherwise referred to as a local number.

While this invention has been particularly shown and described with reference to preferred embodiments, it will be understood to those skilled in the art that various changes in form and detail may be made without departing from the scope of the invention as defined by the claims.

What is claimed is:

1. A method of controlling a communication session between a user of a communication network and a communication system, wherein the communication network comprises a packet switched network and a public switched telephone network (PSTN), and wherein the communication system operates on the packet switched network, said method comprising:
   receiving a session request packet associated with the user, from a mobile device, at a first node located in the packet switched network;
   responsive to receiving the session request packet, determining whether establishing a connection associated with the session request packet should be handled by the first node;
   responsive to determining that establishing the connection should not be handled by the first node, sending a redirect data packet to the mobile device effective to redirect establishing the connection to another node;
   responsive to determining that establishing the connection should be handled by the first node, initiating a session for the user utilizing the communication system at the first node, wherein during the session associated with the first node, the method further comprises:
      providing, from the first node to the mobile device, at least part of a calling identity of an entity for use by the mobile device during a call between the user and the entity via the communication system, wherein the calling identity of the entity is used to establish a connection between the mobile device and a second node located in the PSTN without using the packet switched network;
      determining an address of the entity; and
      associating the calling identity of the entity with the address of the entity by enabling mapping of, in a data store in the packet switched network, the calling identity of the entity to the address of the entity;
      wherein upon termination of the session, the calling identity of the entity is disassociated from the address of the entity by enabling removal of from the data store in the packet switched network, the association of the address of the entity with the calling identity of the entity.

2. A method as claimed in claim 1 wherein the calling identity of the entity is associated with the address of the entity at a third node located in the packet switched network.

3. A method as claimed in claim 1 wherein the calling identity of the entity is provided to the mobile device in at least one data packet.

4. A method as claimed in claim 1 wherein the calling identity of the entity comprises at least a first number.

5. A method as claimed in claim 4 wherein the calling identity of the entity is determined from the first number and a contact identifier used to identify the entity.

6. A method as claimed in claim 5 wherein the calling identity of the entity is determined from the first number and the contact identifier used to identify the entity according to a call method.

7. A method as claimed in claim 6 wherein the call method is dependent on the location of the mobile device.

8. A method as claimed in claim 6 wherein the call method is dependent on the type of the mobile device.

9. A method as claimed in claim 1 wherein the method further comprises sending, from the first node to the mobile device, a contact identifier data packet comprising a list of identifiers, wherein one of said listed identifiers is used to identify the entity.

10. A method as claimed in claim 1, wherein the first node is further configured to execute a communication instance configured to communicate with a client program executing on the mobile device.

11. A method as claimed in claim 10, wherein the communication instance is assigned to the user of the mobile device in response to receiving the session request packet from the mobile device.

12. A method as claimed in claim 11 wherein initiating a session for the user with the communication system operating on the packet switched network comprises assigning the communication instance to the user.

13. A method as claimed in claim 10, wherein the redirect data packet further comprises update information for updating software of the client program.

14. A method as claimed in claim 13 wherein the update information comprises a Uniform Resource Locator defining a location in the packet switched network from which updates for the client program are to be downloaded.

15. A method as claimed in claim 1 wherein the entity is a user of the communication network, a voice mail record, or an application for carrying out a control command.

16. A method as claimed in claim 1 wherein the session is terminated in response to receiving a logout request data packet from the mobile device associated with the user.

17. The method as recited in claim 1, the first node configured to run a plurality of sessions for a plurality of user devices.

18. The method as recited in claim 1, the determining whether establishing a connection associated with the session request packet should be handled by the first node comprising determining based, at least in part, on balancing a number of client programs being handled by each session node of a plurality of session nodes in the packet switched network.

19. A communication network arranged to control a communication session between a user of the communication network and a communication system, wherein the communication network comprises a packet switched network and a public switched telephone network (PSTN), and wherein the communication system operates on the packet switched network, the communication network further comprising:
   a first node located in the packet switched network, the first node configured to:
      receive a session request packet from a user associated with a user mobile device;
      responsive to receiving the session request packet, determine whether establishing a connection associated with the session request packet should be handled by the first node;
      responsive to determining that establishing the connection should not be handled by the first node, send a data packet to the mobile device effective to redirect establishing the connection to another node;
      responsive to determining that establishing the connection should be handled by the first node, initiate a session for the user associated with the user mobile device utilizing the communication system to a calling identity of an entity for use by the mobile device during a call between the user and the entity via the communication system, wherein the calling identity is used to establish a connection between the mobile device and a second node located in the PSTN network without using the packet switched network; and utilize a third node located in the packet switched network, the third node configured to associate the calling identity of the entity with the address of the entity by mapping, in a data store in the packet switched network, the calling identity of the entity to the address of the entity, wherein upon termination of the session, the third node is further configured to disassociate the calling identity of the entity from the address of the entity by removing from the data store in the packet switched network the association of the address of the entity with calling identity of the entity.

20. The communication network as recited in claim 19, the first node further configured to send a data packet to the mobile device in response to determining that establishing the connection should be handled by the first node, the data packet comprising:
- an attribute configured to indicate a connected state associated with the session;
- an attribute configured to indicate a latest version number of a client program that is available to run on the mobile device; and
- an attribute configured to include a Uniform Resource Locator (URL) that indicates from where said latest version of the client program is to be downloaded.

* * * * *